April 18, 1950
K. L. BURGENER
2,504,641
RELAY CIRCUIT FOR SIGNAL CONTROL
Filed June 28, 1945
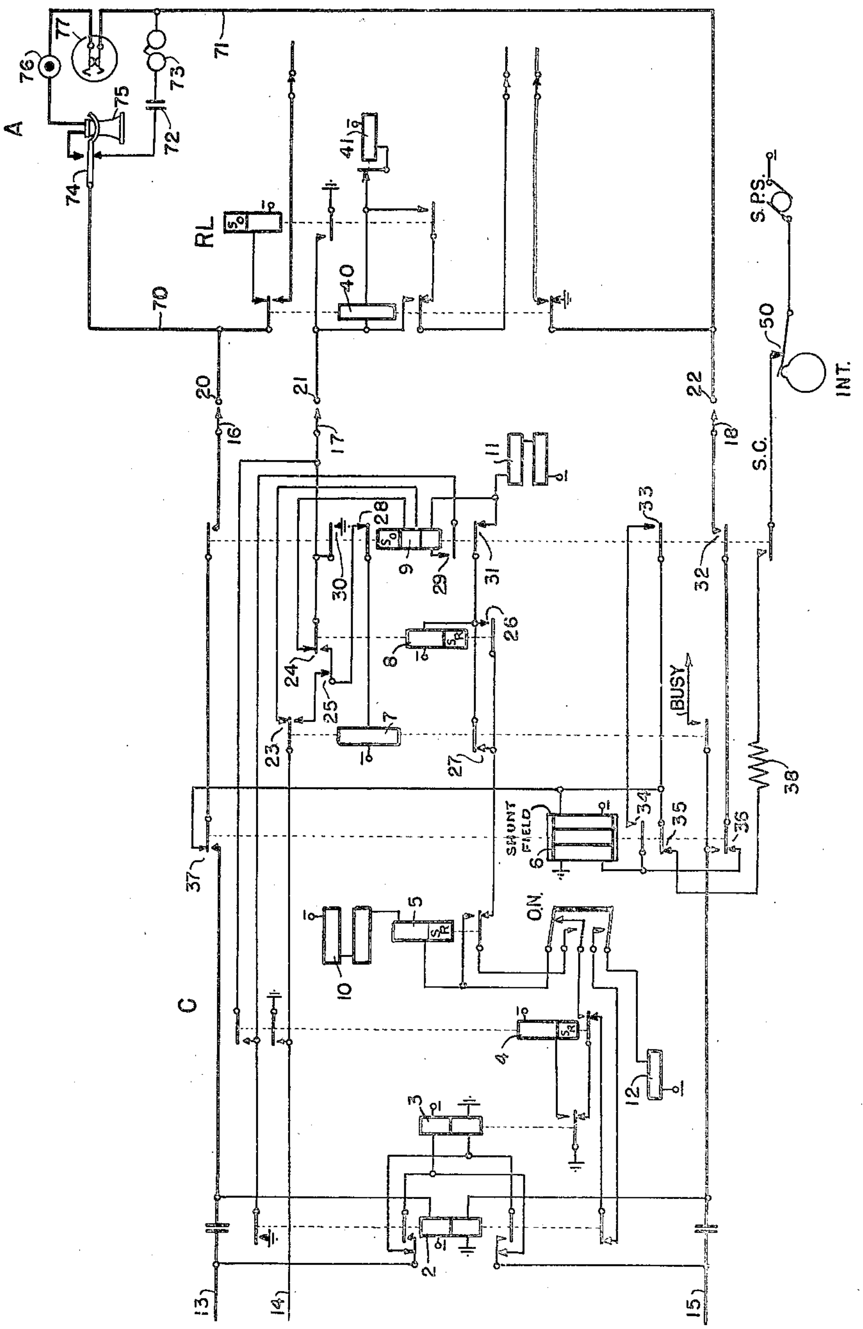
INVENTOR.
KARL L. BURGENER
BY [signature]
ATTORNEY Patented Apr. 18, 1950

2,504,641

UNITED STATES PATENT OFFICE 2,504,641

RELAY CIRCUIT FOR SIGNAL CONTROL

Karl L. Burgener, Villa Park, Ill., assignor to Automatic Electric Laboratories, Inc., Chicago, Ill., a corporation of Delaware Application June 28, 1945, Serial No. 601,966

23 Claims. (Cl. 179—18)

This invention relates to telephone or like systems in general, and more particularly to improved means for disconnecting signaling current from a called line under control of the line, in systems using automatic signaling.

An object of this invention is to provide an improved signaling means for systems of this character in which the signal control relay cannot be operated by current flowing over the signaling power lead and the called line, but can be operated by current flowing over the called line from a power source connected directly to the signal control relay.

Another object of the invention is to utilize a magnetic shunt in a signal control relay.

A further object of the invention is to provide a signal control relay that will operate only when the voltage of the operating power source is higher than the positive or negative voltage of the signaling power source.

Another object of the invention is to provide an improved signal control circuit in which the possibility of false operation of the signal control relay is reduced to a minimum.

Prior to this invention double wound, slow acting relays have been widely used for quick disconnect of the signaling current under control of the called line. Signaling current, on which a direct current source, usually the exchange battery, is superimposed, is supplied to the called line in series with a signaling winding of the relay. The slow acting feature of the relay causes counter electro motive forces to build up which nullify the effect of magnetic fields building up in the relay from the signaling current flowing through the signaling winding. The frequency, the magnitude of the voltage, and the wave form of the signaling current are important factors in the signaling range that can be provided with a signal control relay of this type. The slow acting feature of the relay is effective only while magnetic fields in the relay are building up rapidly which is only for a small fraction of a second. The power supplied over the signaling lead usually operates a single contact when the called line answers which closes a local circuit to an operating winding of the relay to cause complete operation of the relay and the disconnection of the signaling current from the line. The field of the operating winding and the field of the signaling winding must be in the same direction to insure complete operation of the signal control relay, and the relay will be most readily operated when the signaling voltage is at its highest point and in the same direction as the direct current voltage superimposed thereon.

The power for operating the control contact responsive to the called line answering is supplied over the signaling power lead. When the amount of signaling current flowing over the line is relatively high there is a tendency for the signal control relay to operate during signaling prior to the called line answering. This limits the number of signaling devices that can be associated with a line, the characteristics of the signaling devices, and the general line characteristics that can successfully be employed in systems using automatic signaling with a winding of the signal control relay incorporated in the signaling circuit to provide for disconnecting the signaling current under control of the called line during both the signaling and the silent periods.

It is the aim of the present invention to eliminate this tendency toward false operation so that automatic signaling with disconnection of the signaling current under control of the called line can be used on lines with less limited characteristics and so that a larger number of signaling device, the characteristics of which need not be closely controlled, can be used on the lines.

To accomplish this a signal control circuit is provided in the connecting link in which a double wound shunt field relay such as described in Patent 1,544,300 granted June 30, 1925, to Charles J. Erickson is used as a signal control relay. When a connecting link is conditioned to signal a called line the signal control relay is connected differentially to a signaling power source of variable potential in series with a suitable resistor, one winding of the relay being included in the circuit for signaling current to the called line, the other winding being in parallel with the signaling circuit for the line.

The armature of the shunt field relay will not operate when only one of its windings are energized nor will it operate when both of its windings are energized if the magnetic fields developed in its windings are in opposite directions. A balance between the strength of the magnetic fields developed in the windings is not necessary to prevent operation of the armature. As the windings of the relay are connected differentially in respect to the signaling current lead the fields developed in the windings will be in opposite directions and thus current flowing over the signaling current lead will not operate the signal control relay.

An operating power source, one terminal of which is connected to ground, is connected to the windings of the signal control relay, the grounded terminal being connected to the winding which is in series with the line signaling circuit and the other terminal being connected to the winding which is in multiple with the line signaling circuit. The operating power source is also superimposed on the signaling power source in the well known manner. The windings of the signal control relay are connected to the opposite sides of the line so that when the line characteristics are changed responsive to the called line answering, and when the voltage of the signaling power source reaches a favorable point in relation to the voltage of the operating power source current from the operating power source will flow over the line thru the windings of the signal control relay in series. The magnetic fiields developed in the windings of the signal control relay by this current will be in the same direction and will operate the armature of the relay. The armature, in operating, closes a local circuit through the two windings of the relay in series causing the signal control relay to complete its operation and disconnect itself and the signal power source from the line.

A feature of this invention is that the signal control relay operates, and the signaling power source is disconnected from the line, when the voltage of the signaling power source is low in relation to the voltage of the operating power source.

Another feature of the invention is that when interrupted signaling is used a power source does not have to be connected to the signaling power lead during the silent period.

Another feature of the invention is that current flowing over the line from the signal power lead will not cause false operation of the signal control relay.

The objects and features of the invention will be understood better from the following detailed description, taken in conjunction with the accompanying drawing which forms a part thereof, showing the invention as applied to the well known Strowger step by step system. It will be understood, however, that this arrangement is described by way of example only, that various modifications may be made in the circuit details by those skilled in the art without departing from the spirit of the invention, and that this invention can be applied to other systems.

Referring to the drawing, there is shown by means of the usual circuit diagrams a connector switch C, employing the new and improved signaling control feature, a rotary line switch RL, a subscriber's substation A, an interrupter INT, and a source of signaling power SPS.

The connector switch C is of the well known Strowger vertical and rotary type such as described in Patent 2,040,153 granted May 12, 1936, to Seth Peterson. The connector C has access to automatic subscriber's lines such as the lines of substation A. In the present case connector C is accessible to calling subscribers such as subscriber A, by way of their individual line switches such as RL.

The line switch RL is of the well known rotary type in which the wipers have no normal position and which have access to connector switches such as connector C.

The substation A consists of a signaling device, a calling device and the usual instrumentalities to enable the subscriber to carry on conversation. The line of substation A terminates in the line-switch RL and connector bank contacts in connectors such as connector C.

The interrupter INT is of the well known motor driven type and is connected over the S. C. conductor to connectors such as connector C. The interrupter alternately connects and disconnects the signaling power source to the S. C. conductor.

The signaling power source SPS is an alternating current generator of the well known type with the operating power sources superimposed upon it and is alternately connected to and disconnected from connectors such as connector C through the interrupter INT.

The normal operation of connector C is well known, but will be briefly described nevertheless, preliminary to explaining the operation of the signaling control feature.

Assuming that connector C has been seized by a line switch, the calling line will be extended to trunk conductors 13 and 15, which results in the energization of line relay 3, followed by the energization of release relay 4. The latter grounds the release trunk conductor 14 so as to provide a holding circuit for the calling line switch.

The calling party now dials the tens digit in the number, which causes line relay 3 to deenergize momentarily a number of times, sending impulses to the vertical magnet 10. This steps the wipers 16, 17, and 18 until they stand opposite the level in which the called line is terminated. The slow relay 5 is in series with the vertical magnet and cooperates with the off normal springs ON to transfer the impulse circuit to the rotary magnet 11 at the end of the vertical operation.

The calling subscriber may now dial the last or units digit of the called number. The line relay operates as before, but now sends a series of impulses to the rotary magnet 11. Accordingly, the wipers 16, 17, and 18 are rotated step by step until they come to rest on the called line terminals. It will be assumed that the called line is the line of station A and that the wipers are positioned on contacts 20, 21 and 22.

If the called line is idle when connected with, a circuit is completed for energizing switching relay 9, extending from the grounded conductor 14, by way of contacts of test relay 7, the upper winding of relay 9, contacts of relay 8, test wiper 17, test contact 21, the cut-off relay 40 of line switch RL, and the stepping magnet 41 of the said line switch to battery. Relay 9 pulls up in series with the cut-off relay, which latter performs the usual well known functions. Relay 9 is slightly slow to operate, to give time for the operation of the cut-off relay. As the armature of relay 9 is attracted, the pair of springs represented by armature 29 and its working contact are closed first, thus completing an energizing circuit for the lower locking winding. The two windings then cooperate in fully operating the relay and thus all springs of the relay are actuated. Armature 30 grounds the test wiper 17, armature 31 opens the rotary magnet circuit, the upper armature and armature 32 connect up the line wipers 16 and 18, armature 33 prepares a local circuit for relay 6, and the lower armature connects the signaling power source SPS, through armature 50, the S. C. lead, resistor 38, and armature 35 of relay 6 to the right winding of relay 6 and to line conductor 70, through armature 37, upper armature of relay 9, line wiper 16, and bank contact 20. Signaling current is now projected over the line and flows through the condenser 72, the bell 73, line conductor 71, bank contact 22, wiper 18, armature 32, armature 36 and the left winding of relay 6 to ground to signal the called substation.

The upper terminal of the left winding of the relay 6 is connected to an operating power source, which in this case is the operating battery for the switching equipment and has the positive terminal grounded. The operating power source is superimposed on the signaling power source in the well known manner, thus a circuit for signaling current is completed to the right winding of relay 6 through the negative battery terminal, the signaling power source, armature 50, the S. C. lead, lower armature of relay 9, resistor 38, and armature 35. Signaling current also flows through the left winding of relay 6 in series with the line conductors over the circuit previously traced.

The relay 6 is a shunt field relay and its windings are connected differentially with respect to the signaling current. The armature of the relay 6 will not be operated because the fields developed in the windings at this time are in opposite directions.

When the receiver 75 is removed from the switch hook 74 at the called telephone the line conductor 70 is transferred from the condenser 72 to the receiver 75 and a circuit for the operating power source is completed through the right winding of relay 6, armature 37, upper armature of relay 9, wiper 16, contact 20, line conductor 70, hook switch 74, receiver 75, transmitter 76, calling device 77, line conductor 71, contact 22, wiper 18, armature 32, armature 36, through the left winding of relay 6 to ground.

The voltage of the signaling power source SPS fluctuates rapidly between relatively high positive and negative values and passes through zero twice in each cycle. It is alternately connected to and disconnected from the connecting link circuits at interrupter springs 50.

If the receiver is removed from the switch hook while signaling current is being projected over the line, current from the operating power source connected to the right winding of the relay 6 will not flow over the line unless the voltage of the signaling power source is relatively low. When the voltage of the signaling power source is near zero, current from the operating power source flows through the right winding of the relay 6 over the line conductors through the left winding of relay 6 to ground over the circuit previously traced. The fields built up in the windings of the relay 6 by this current are in the same direction and the armature of the relay is attracted. The voltage of the signaling power source is low at this time hence the fields developed in the windings of the relay 6 by current from the signaling power source will be weak and will have little effect on the performance of the relay. As the armature of the relay 6 is attracted the pair of springs represented by armature 34 and its working contact are closed first, thus completing a local circuit for the two windings of the relay 6 from the operating power source through the right winding of relay 6, armature 33, armature 34, and the left winding of relay 6 to ground. The two windings then cooperate in fully operating the relay and thus all the springs of the relay are actuated. Armature 35 disconnects the signaling power source from the relay 6, armatures 36 and 37 disconnect the windings of relay 6 from the line conductors 71 and 70 and connect the line conductors to the windings of the relay 2 to complete the talking circuit.

If the receiver is removed from the switch hook during the silent period the signaling power source is disconnected at the interrupter springs 50 and the windings of the relay 6 are energized from the operating power source through the right winding of relay 6 and the line conductors 70 and 71 to ground through the left winding of relay 6 over the circuit previously traced. The relay 6 operates to disconnect itself and the SPS lead from the line and to complete the talking circuit as described above.

The release of the connector is controlled by the release relay 4, which falls back if the line is opened for more than a very short interval, and closes a circuit for the release magnet 12. The magnet circuit is broken at the off normal springs when the switch shaft reaches normal position. The connector is of the release by last party type and therefore the releasing operation is delayed if the called party fails to hang up.

Having described my invention, what is considered to be new and is desired to be protected by Letters Patent will be set forth in the following claims.

What is claimed is:

1. In a signaling system, a signal, a power source, a signaling power source varying between certain positive and negative values, a relay, means for completing a circuit through said relay and said signal and said sources to operate said signal, means for causing operation of the relay in case said circuit is completed only when the signaling current source is below its certain positive and negative values.

2. In a signaling system, a relay, an alternating current source and a direct current source, means for completing a circuit for the relay including both sources, means for preventing operation of the relay over said circuit when the alternating current is at its highest positive or negative values and for permitting operation thereof over said circuit when the alternating current is at a point between said values.

3. A signaling system as set forth in claim 1 in which said relay disconnects the signaling power source from said circuit when operated.

4. In a signaling circuit, a plural wound relay, a source of signaling current, another source of current, means for closing a circuit including said sources in series with one winding of said relay and for closing another circuit including said source of signaling current and the other winding of said relay, means for preventing the operation of said relay from said first mentioned circuit and said other circuit, and means for completing a third circuit including said windings in series inclusive of said other source, said relay operated only over said last circuit.

5. In a signaling system, a signal, a signaling current source, a plural wound relay, means for completing a circuit from said signaling current source through a winding of said relay and said signal to operate said signal, means for completing another circuit from said signaling current source through another winding of said relay, said signal being excluded from said other circuit, and a magnetic shunt in said relay to prevent the operation thereof over said circuits.

6. In a signaling system, a signal, a signaling current source, a relay having a power source connected thereto, means for completing a signaling circuit including said signaling current source, a winding of said relay, and said signal, a magnetic shunt in said relay to prevent the operation thereof by said signaling current, and means for completing another circuit including said relay and the power source connected thereto, and all of said signaling circuit except said signaling current source and said signal, said relay operative over said other circuit to disconnect said signaling current source from said signaling circuit.

7. In a signaling system, a relay having a main power source connected thereto, a line circuit, a signaling power source having one terminal connected to a terminal of said main power source, means for completing a circuit for signaling current over said line, said circuit including a winding of said relay, said signaling power source, and said main power source, a magnetic shunt in said relay for preventing its operation over said circuit for signaling current responsive to the closure of said line, said relay operative from the main power source connected thereto responsive to the closure of said line.

8. A signaling system as set forth in claim 7 with means, effective on the operation of said relay, for disconnecting said signaling power source from said circuit for signaling current.

9. In a signaling system, a relay having both terminals of an operating power source connected directly thereto, a signaling power source with said operating power source superimposed thereon, a line circuit, means for interconnecting the relay, the signaling power source with the operating power source superimposed thereon, and the line circuit, said relay operable from said operating power source connected thereto responsive to the closure of the line to disconnect said signaling power source from said line, said relay being inoperative from said signaling power source with said operating power source superimposed thereon.

10. In a signaling system, a relay having two magnetic circuits, an operating power source connected thereto, a signaling power source, a line circuit including a signaling device, means for interconnecting the relay, the signaling power source, and the line circuit to operate the signaling device thereon, one of said magnetic circuits being effective to prevent the operation of said relay from said signaling power source, and the other of said magnetic circuits being effective to operate said relay from said operating power source to disconnect the signaling power source from the line responsive to the closure thereof.

11. In a signaling system, a relay having a closed magnetic circuit and a second magnetic circuit, a main power source, a second power source of variable potential, means for completing a circuit to the relay and said power sources, said closed magnetic circuit to prevent the operation of the relay from said circuit when the positive or negative potential of said second power source is greater than the potential of said main power source, and said second magnetic circuit to permit operation of the relay from said circuit when the positive or negative potential of the second power source is less than the potential of the main power source.

12. In a signaling system, a line circuit including a signaling device, a source of signaling current, a relay having two magnetic circuits, means for completing a circuit for said signaling current to operate said signaling device, said circuit including a winding of the relay, one of said magnetic circuits effective to prevent the operation of said relay from said signaling current, and means, including the other of said magnetic circuits, for operating the relay responsive to the closure of said line circuit.

13. In a signaling system, a line circuit including a signaling device, a source of signaling current, a plural wound relay having two magnetic circuits, means for completing a circuit for said signaling current to operate said signaling device, said circuit including a winding of the relay, one of said magnetic circuits effective to prevent the operation of said relay from said signaling current, means for completing a second circuit including said winding of the relay and another winding of the relay, said other magnetic circuit effective to operate said relay from said second circuit, and means effective on the operation of said relay to disconnect said source of signaling current from said circuit for signaling current.

14. In a telephone system, an operating power source, a signaling power source of varying voltage, a line circuit including a signal, a relay, means for interconnecting said power sources, said relay, and said line circuit to operate said signal, means in said relay for permitting its operation to disconnect said signaling power source from the line responsive to the closure thereof when the voltage of said operating power source is greater than the voltage of said signaling power source, and further means in said relay to prevent the operation of the relay when the voltage of the operating power source is lower than the voltage of the signaling power source.

15. In a signaling system, a relay, two windings for said relay, a main power source, a second power source of varying potential, means for completing a differential circuit to said windings for said second power source, means for completing a series circuit to said windings for said main power source, and means in said relay for permitting its operation only when the voltage of the second power source is lower than the voltage of the main power source.

16. In a signaling system, a first power source, a plural wound signal control relay having a terminal of one winding connected directly to one terminal of said first power source, and having a terminal of another winding connected directly to another terminal of said first power source, another power source having one terminal connected to said one terminal of said first power source, a signaling circuit, means for connecting another terminal of said second power source to another terminal of said one winding and thru said signaling circuit to another terminal of said other winding, means for preventing the operation of said relay over said signaling circuit, means for altering said signaling circuit, and means in said relay responsive to the altering of said signaling circuit for operating said relay from said first power source.

17. In a signaling system, a relay, two windings for said relay, means in said relay for permitting its operation only when said two windings are energized with their magnetic fields in the same direction, a signal and a signaling current source, means for completing a circuit for said signaling current and said signal, said circuit including only one winding of said relay, and means for energizing said two windings in series to operate said relay, said relay being effective upon operation for opening said circuit for signaling current.

18. In a signaling system, a double wound relay requiring the energization of its two windings for operation, a signal, a source of signaling current, means for completing a circuit for signaling current thru one winding of said relay and said signal in series, said relay being inoperative therefrom, and means exclusive of said signaling current source for energizing the two windings of said relay in series to operate the same, said last means being effective with or without said signaling current connected to said one winding.

19. In a signaling system, a relay, two windings for said relay, a magnetic structure in said relay for permitting operation of the relay only when said two windings are energized with their fields in the same direction, a main power source, a signaling power source of varying voltage, a line including a signal, means for completing a circuit for said signaling power source and said line to operate said signal and for completing another circuit for said signaling power source and one of said windings, said magnetic structure being effective to prevent the operation of said relay from said two circuits, and means for energizing said two windings in series with said line and said main power source to operate said relay, said magnetic structure being effective for preventing the operation of said relay by said last means when the voltage of said signaling power source exceeds the voltage of said main power source regardless of the polarity of the signaling power source.

20. In a signaling system, a plural wound relay, a line circuit and a signal therefor, a source of signaling potential, a circuit including said source of signaling potential for energizing one winding of said relay, means in said relay for preventing the operation thereof responsive to energization of said one winding, another circuit including said source of signaling potential and said signal, and means for energizing said one winding and another winding of said relay in series with said line circuit, said relay operated responsive to the energization of said two windings.

21. A signaling system as set forth in claim 20 in which said relay, when operated, disables said circuits for said source of signaling potential.

22. In a signaling system, a double wound relay operative only when both windings are energized in a certain manner, a line having a signal, a source of signaling power, a circuit for operating said signal, said circuit including on winding of said relay, said source and at least part of said line, and means for energizing both windings in said certain manner in series with said line to operate said relay.

23. A signaling system as set forth in claim 22 in which said relay, when operated, disables said circuit for operating said signal.

KARL L. BURGENER.

REFERENCES CITED

The following references are of record in the file of this patent:

UNITED STATES PATENTS

| Number | Name | Date |
|---|---|---|
| 1,111,742 | Godfree | Sept. 29, 1914 |
| 1,203,887 | Lundell | Nov. 7, 1916 |
| 1,292,499 | Martin et al. | Jan. 28, 1919 |
| 1,373,624 | Martin | Apr. 5, 1921 |
| 1,675,312 | Wicks | June 26, 1928 |
| 2,299,660 | Stonebridge Jr. | Oct. 20, 1942 |
| 2,318,364 | Bostwick et al. | May 4, 1943 |

FOREIGN PATENTS

| Number | Country | Date |
|---|---|---|
| 73,335 | Sweden | Sept. 7, 1928 |